(12) United States Patent
Ueda et al.

(10) Patent No.: US 8,319,919 B2
(45) Date of Patent: Nov. 27, 2012

(54) TRANSFLECTIVE TYPE LIQUID CRYSTAL DISPLAY DEVICE

(75) Inventors: Seiya Ueda, Tokyo (JP); Shohei Yasuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 265 days.

(21) Appl. No.: 12/757,141

(22) Filed: Apr. 9, 2010

(65) Prior Publication Data

US 2010/0271579 A1 Oct. 28, 2010

(30) Foreign Application Priority Data

Apr. 23, 2009 (JP) ................... 2009-105209

(51) Int. Cl.
  G02F 1/1335 (2006.01)
  G02F 1/1343 (2006.01)
(52) U.S. Cl. .................. 349/114; 349/144; 349/146
(58) Field of Classification Search .............. 349/114, 349/144, 146
  See application file for complete search history.

(56) References Cited

U.S. PATENT DOCUMENTS

| | | |
|---|---|---|
| 2005/0185120 A1 | 8/2005 | Kitoh et al. |
| 2007/0070273 A1* | 3/2007 | Yoshida et al. ............ 349/114 |

FOREIGN PATENT DOCUMENTS

| | | |
|---|---|---|
| JP | 2005-266778 | 9/2005 |
| JP | 2005-338472 | 12/2005 |
| JP | 2006-171723 | 6/2006 |
| JP | 2007-86575 | 4/2007 |
| JP | 2007-133084 | 5/2007 |

OTHER PUBLICATIONS

Office Action issued Apr. 19, 2011, in Japanese Patent Application No. 2009-105209 (with English-language translation).

* cited by examiner

*Primary Examiner* — Mark Robinson
*Assistant Examiner* — Charles Chang
(74) *Attorney, Agent, or Firm* — Oblon, Spivak, McClelland, Maier & Neustadt, L.L.P.

(57) ABSTRACT

A transflective type liquid crystal display device according to an exemplary aspect of the invention includes: a liquid crystal layer; a first sub-pixel electrode that is constituted of a transmissive region transmitting light from a back surface side to a display surface side; a second sub-pixel electrode that is constituted of a reflective region reflecting light being incident from the display surface side; and a connecting portion that electrically connects the first sub-pixel electrode and the second sub-pixel electrode to each other. The second sub-pixel electrode being constituted of the reflective region that is adjacent to the first sub-pixel electrode being constituted of the transmissive region has a reflective conductive thin film in which a hollowed out cutout portion is formed, in a region extending from the connecting portion connecting the first sub-pixel electrode and the second sub-pixel electrode to each other.

18 Claims, 14 Drawing Sheets

IDEAL LIQUID CRYSTAL ALIGNMENT

IDEAL LIQUID CRYSTAL ALIGNMENT

TRANSFLECTIVE TYPE LIQUID CRYSTAL DISPLAY DEVICE

INCORPORATION BY REFERENCE

This application is based upon and claims the benefit of priority from Japanese patent application No. 2009-105209, filed on Apr. 23, 2009, the disclosure of which is incorporated herein in its entirety by reference.

BACKGROUND OF THE INVENTION

1. Field of the Invention

The present invention relates to a transflective type liquid crystal display device. More specifically, the present invention relates to a transflective type liquid crystal display device that has sub-pixel electrodes.

2. Description of Related Art

Liquid crystal display devices are in widespread use as displays of mobile phones, car navigation systems, digital cameras, portable game devices, PDAs (Personal Digital Assistants), personal computers, and the like. The displaying scheme of the liquid crystal display panels is classified broadly into the following three types, i.e., a transmissive type, a reflective type, and a transflective type. The transmissive type is a displaying scheme in which a light source called a backlight is lit, such that light transmitting through a liquid crystal display panel carries out displaying. Hence, though the transmissive type exhibits high visibility in dark places, the visibility is poor in bright places. On the other hand, the reflective type is a displaying scheme in which light incident upon a liquid crystal display panel is reflected therefrom, to carry out displaying. Hence, though high visibility is achieved in bright places, the visibility is poor in dark places. The transflective type is a displaying scheme that combines both the functions of the transmissive type and the reflective type, and is capable of always providing a high visibility display by switching the display modes depending on the surrounding brightness. Owing to the excellent display characteristics thereof, the transflective type liquid crystal display devices are widely applied to portable or mobile equipment and the like.

In many transflective type liquid crystal display devices, the ECB (Electrically Controlled Birefringence) mode or the TN (Twisted Nematic) mode is employed. However, in response to recent increasing needs for higher contrast and a wider viewing angle, much attention is now focused on liquid crystal display devices of the vertical alignment (VA: Vertical Alignment) mode in which pixels are divided into a plurality of sub-pixel electrodes (sub-pixel regions) (for example, Japanese Unexamined Patent Application Publication No. 2005-266778).

Japanese Unexamined Patent Application Publication No. 2005-266778 discloses a structure in which a pixel region is divided into a plurality of sub-pixel electrodes, and the sub-pixel electrodes are connected by a narrow-width connecting portion. Further, a reflective conductive thin film that is a light-shielding conductive film is arranged so as to cover the connecting portion and part of the transmissive region at the location near the connecting portion.

It has now been discovered that, in accordance with Japanese Unexamined Patent Application Publication No. 2005-266778, in the transmissive region extending from the connecting portion, the liquid crystal alignment is disturbed in some cases, as being originated from a stepped structure that is resulted from the formation of the reflective conductive thin film. This results in an improper display state. Particularly, in the transflective type liquid crystal display device that has both the transmissive region and the reflective region, when the stepped portion enters the transmissive region side, there have been some cases in which the liquid crystal alignment is disturbed as being originated from the stepped portion formed by the transparent conductive thin film and the reflective conductive thin film, which results in an improper display state.

SUMMARY OF THE INVENTION

The present invention has been made in consideration of the background described in the foregoing, and its object is to provide a transflective type liquid crystal display device of high display quality.

A first exemplary aspect of the present invention is a transflective type liquid crystal display device including: a liquid crystal layer; a first sub-pixel electrode that is constituted of a transmissive region transmitting light from a back surface side to a display surface side; a second sub-pixel electrode that is constituted of a reflective region reflecting light being incident from the display surface side; and a connecting portion that electrically connects the first sub-pixel electrode and the second sub-pixel electrode to each other. The second sub-pixel electrode being constituted of the reflective region that is adjacent to the first sub-pixel electrode being constituted of the transmissive region has a reflective conductive thin film in which a hollowed out cutout portion is formed, in a region extending from the connecting portion connecting the first sub-pixel electrode and the second sub-pixel electrode to each other. The present invention possesses an excellent effect of making it possible to provide a high-quality display transflective type liquid crystal display device.

The above and other objects, features and advantages of the present invention will become more fully understood from the detailed description given hereinbelow and the accompanying drawings which are given by way of illustration only, and thus are not to be considered as limiting the present invention.

DETAILED DESCRIPTION OF THE EXEMPLARY EMBODIMENTS

Figure 1:
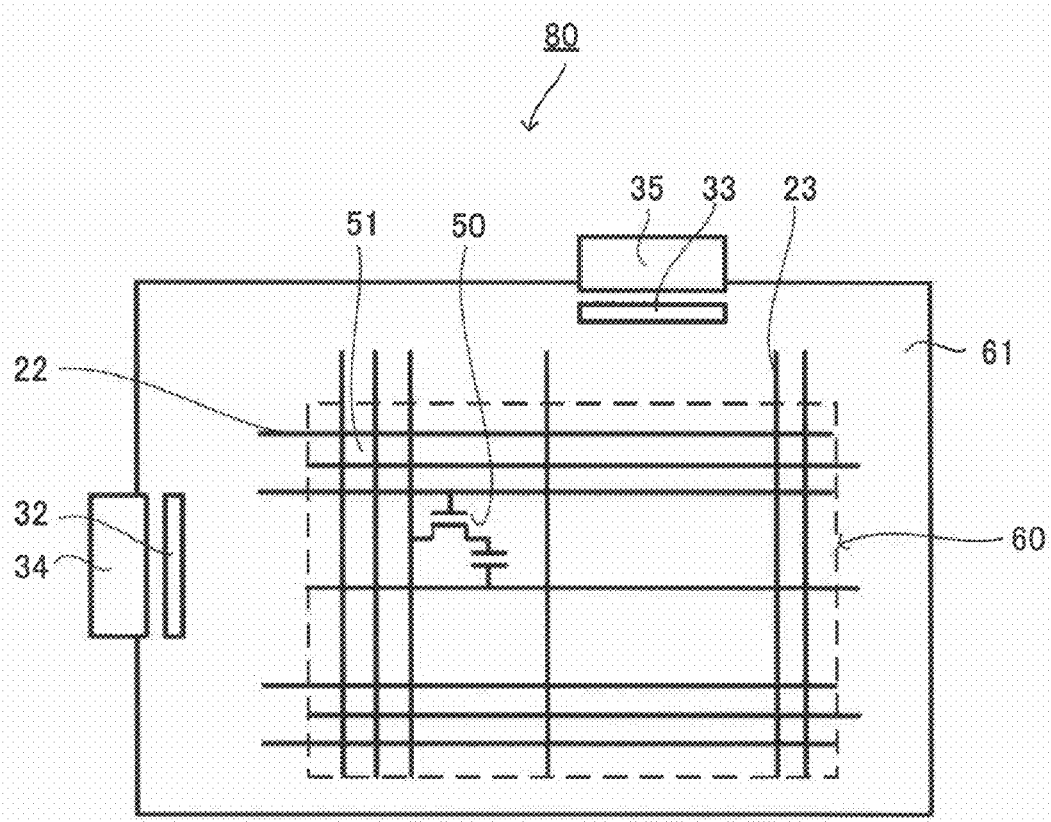
FIG. 1 is a schematic plan view of a liquid crystal display device in accordance with a first exemplary embodiment.

Exemplary embodiments to which the present invention is applied are explained hereinafter. Note that the size and the proportion of members shown in the drawing, which will be referred to in the following, are just for explanatory purposes only, and not necessarily correspond to those of actual members. Through different exemplary embodiments and different comparative examples, identical reference characters are allotted to identical element members, respectively, and explanation thereof will be omitted as appropriate.

First Exemplary Embodiment

Figure 2:
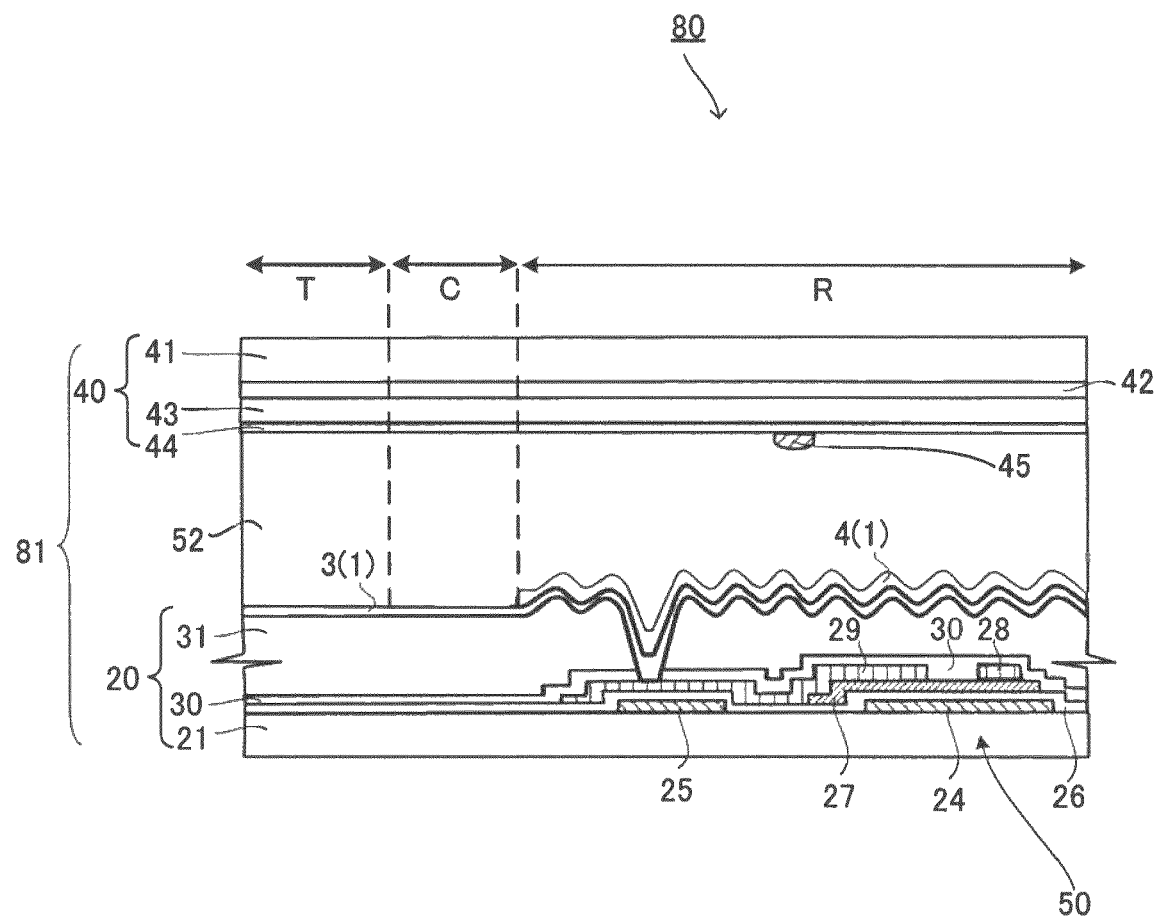
FIG. 2 is a schematic partial and enlarged cross-sectional view of the liquid crystal display device in accordance with the first exemplary embodiment.

FIG. 1 is a schematic plan view for describing the schematic structure of a transflective type liquid crystal display device (hereinafter referred to as "a liquid crystal display device") in accordance with a first exemplary embodiment. FIG. 2 shows a partial cross-sectional view of the structure of the liquid crystal display device in accordance with the first exemplary embodiment. In FIG. 2, R denotes a reflective region; T denotes a transmissive region; and C denotes a connecting region that connects adjacent sub-pixel electrodes to each other (the same holds true in the drawings that follow).

As shown in FIGS. 1 and 2, a liquid crystal display device 80 includes a liquid crystal display panel 81 and the like. The liquid crystal display panel 81 includes a thin film transistor array substrate (hereinafter referred to as the "TFT (Thin Film Transistor) substrate") 20 being a first substrate, a counter substrate 40 being a second substrate, pixel electrodes 1, a counter electrode 44, gate wirings 22 each being a scan line, source wirings 23 each being a signal line, a liquid crystal layer 52, a gate driver IC 32, a source driver IC 33, a first external wiring 34, a second external wiring 35, a thin film transistor 50, and the like. The liquid crystal display panel 81 (see FIG. 2) is structured to have a backlight (not shown) arranged on its opposite-viewer side, such that light is emitted toward a viewer side through the liquid crystal display panel 81.

The liquid crystal display device 80 is provided with, as shown in FIG. 1, a display region 60 formed into a rectangular shape, and a frame region 61 formed into a frame-like shape outside the display region 60. In the display region 60, a plurality of gate wirings 22 and a plurality of source wirings 23 are formed. The gate wirings 22 extend in the horizontal direction and are arranged to be juxtaposed to one another in the vertical direction in FIG. 1. The source wirings 23 extend in the vertical direction and are arranged to be juxtaposed to one another in the horizontal direction in FIG. 1, so as to intersect with the gate wirings 22 while having an insulating layer (not shown) interposed in between.

A TFT 50 is provided near intersection of the gate wiring 22 and the source wiring 23. A pixel electrode 1 (see FIG. 2) is formed in a region that is surrounded by adjacent ones of the gate wirings 22 and the source wirings 23, which the region functions as a pixel 51 (see FIG. 1). In the pixel electrode 1, as shown in FIG. 2, the reflective region R has a layered structure being constituted of a transparent conductive thin film 3 and a reflective conductive thin film 4. On the other hand, the transmissive region T is structured with the transparent conductive thin film 3. The connecting region C is formed between the transmissive region T and the reflective region R. Similarly to the transmissive region T, the connecting region C is structured with the transparent conductive thin film 3. This will be detailed later.

As shown in FIG. 2, the TFT substrate 20 includes a gate 24, an auxiliary capacitance electrode 25, a gate insulating film 26, a semiconductor layer 27, a source 28, a drain 29, an interlayer insulating film 30, and the like. Each of the source wirings 23 is connected to the pixel electrode 1 via the TFT 50. The pixel electrode 1 is structured with the transparent conductive thin film 3 such as ITO (Indium Thin Oxide), and the reflective conductive thin film 4 of a material exhibiting high reflectivity, for example metal such as aluminum, silver and the like. The region where a matrix of a plurality of pixels 51 is arranged is the display region 60.

As shown in FIG. 2, in the liquid crystal display panel 81, the liquid crystal layer 52 in the vertical alignment mode is enclosed in a space defined by the TFT substrate 20 and the counter substrate 40 which are oppositely arranged to each other, and a seal member (not shown) bonding the substrates to each other. The distance between the substrates is maintained at a prescribed interval by a spacer (not shown). In addition to the above-described constituent elements, the TFT substrate 20 includes an insulating substrate 21, a resin film 31 and the like. As the insulating substrate 21, materials such as light-transmissive glass, polycarbonate, acrylic resin and the like can be used, for example. On the respective outermost surfaces of the TFT substrate 20 and the counter substrate 40 on the liquid crystal layer 52 side, alignment films (not shown) are formed.

The counter substrate 40 is oppositely arranged relative to the TFT substrate 20, as in the foregoing explanation, so as to be arranged on the viewer side. The counter substrate 40 has an insulating substrate 41, and on one surface of the insulating substrate 41 that faces the TFT substrate 20, a color filter 42, a black matrix (not shown), a leveling film 43, the counter electrode 44, a counter electrode projecting portion 45, and the alignment film (not shown) are formed. To the external surfaces of the TFT substrate 20 and the counter substrate 40, polarizing plates (not shown) are arranged, respectively.

As shown in FIG. 1, the frame region 61 of the TFT substrate 20 is provided with the gate driver IC 32 and the source driver IC 33. The gate wirings 22 are arranged so as to extend from the display region 60 to the frame region 61. The gate wirings 22 are connected to the gate driver IC 32 at an end portion of the TFT substrate 20. Similarly, the source wirings 23 are arranged so as to extend from the display region 60 to the frame region 61. The source wirings 23 are connected to the source driver IC 33 at an end portion of the TFT substrate 20. Near the gate driver IC 32, a first external wiring 34 is arranged. Near the source driver IC 33, a second external wiring 35 is arranged. The first external wiring 34 and the second external wiring 35 are wiring substrates such as FPCs (Flexible Printed Circuits), for example.

Various signals from any external source are supplied via the first external wiring 34 to the gate driver IC 32, or supplied via the second external wiring 35 to the source driver IC 33. The gate driver IC 32 supplies, based on a control signal from any external source, a gate signal (scan signal) to each of the gate wirings 22. By the gate signal, the gate wirings 22 are successively selected. The source driver IC 33 supplies, based on a control signal or display data from any external source, a display signal to each of the source wirings 23. In this way, a display voltage that is commensurate with the display data can be supplied to each pixel electrode 1.

Note that, while the gate driver IC 32 and the source driver IC 33 are directly mounted on the TFT substrate 20 using the COG (Chip On Glass) technique in the present exemplary embodiment, the present invention is not limited to such a configuration. For example, the driver ICs may be connected to the TFT substrate 20 by the TCP (Tape Carrier Package).

The liquid crystal display device 80 that is structured as explained in the foregoing drives as follows, for example. A scan signal is supplied from the gate driver IC 32 to each of the gate wirings 22. Each scan signal simultaneously turns ON all the TFTs 50 connected to corresponding one of the gate wirings 22. On the other hand, a display signal is supplied from the source driver IC 33 to each of the source wirings 23, and charge is accumulated in each pixel electrode 1, in an amount that is commensurate with the display signal. Depending on the potential difference between the pixel electrode 1 to which the display signal is entered and the counter electrode 44, the alignment of the liquid crystal molecules of the liquid crystal layer 52 in the vertical alignment mode between the pixel electrode 1 and the counter electrode 44 varies. Thus, the amount of light transmitting through the liquid crystal display panel 81 varies. By changing the display voltage for each pixel 51 in this way, a desired image can be displayed.

Figure 3A:
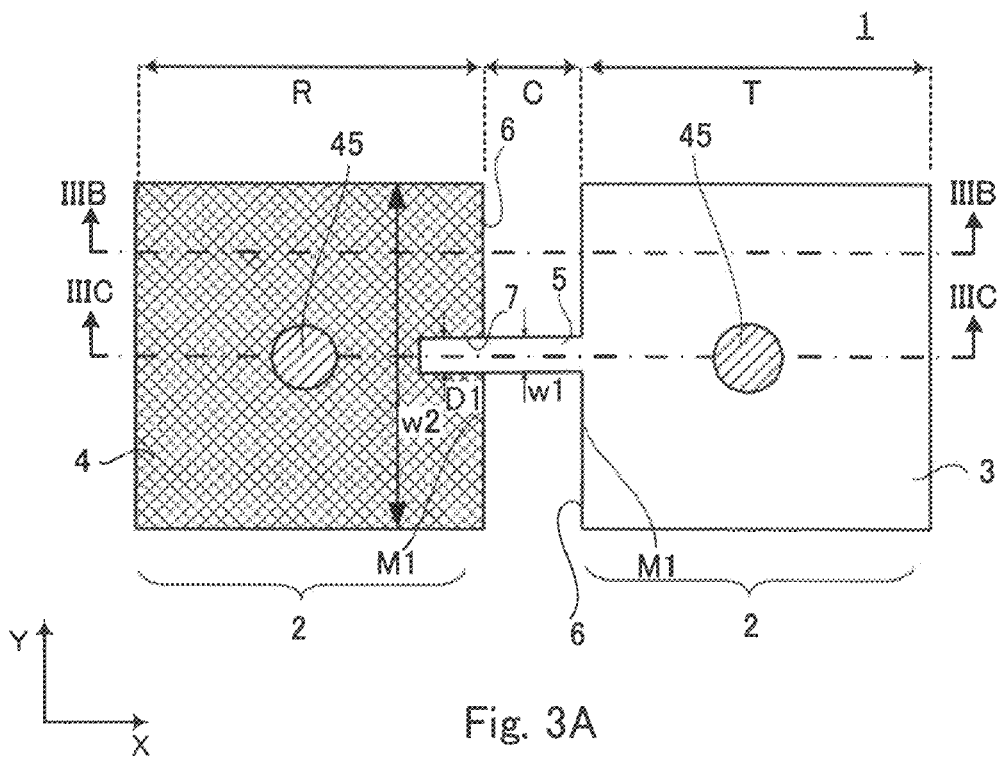
FIG. 3A is a schematic plan view of a pixel electrode in accordance with the first exemplary embodiment.
Figure 3B:
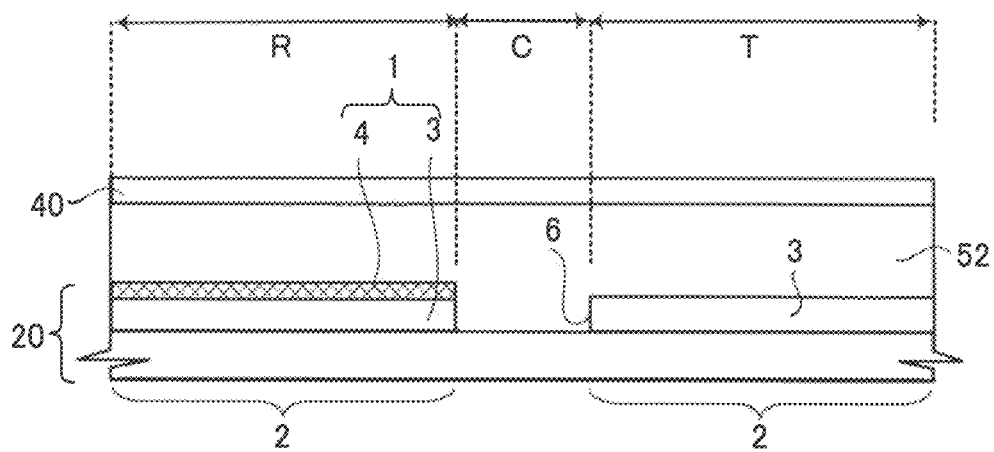
FIG. 3B is a schematic end view for describing the schematic structure of the liquid crystal display device in accordance with the first exemplary embodiment.
Figure 3C:
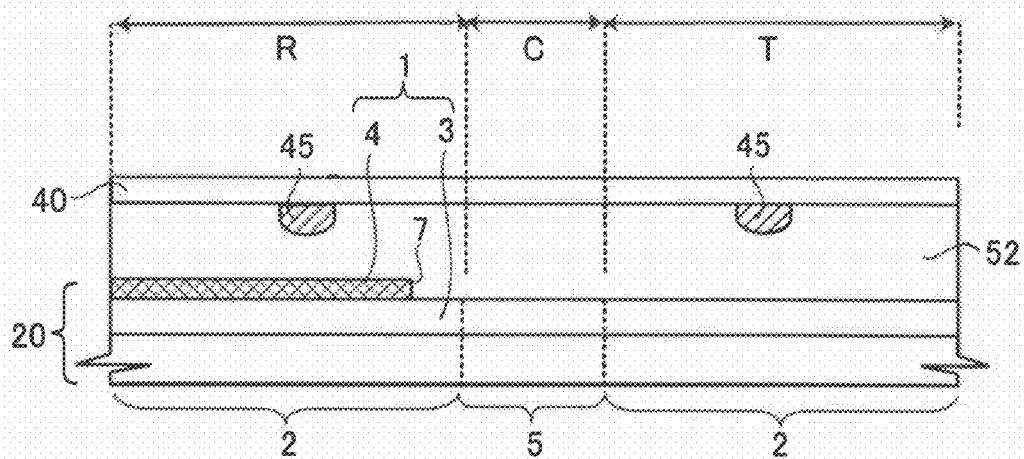
FIG. 3C is a schematic end view for describing the schematic structure of the liquid crystal display device in accordance with the first exemplary embodiment.

Next, characteristic parts of the present invention are explained. FIG. 3A shows a schematic plan view of the pixel electrode 1 in accordance with the first exemplary embodiment. FIG. 3B shows a schematic end view for describing the structure of the liquid crystal display panel 81 (see FIG. 2) taken along a cross-sectional line IIIB-IIIB indicated in FIG. 3A, and FIG. 3C shows a schematic end view for describing the structure of the liquid crystal display panel 81 taken along a cross-sectional line IIIC-IIIC indicated in FIG. 3A. Note that, in FIG. 3A, for ease of explaining the positional relationship of the counter electrode projecting portion 45 relative to the pixel electrode 1, the counter electrode projecting portion 45 is also shown. In FIGS. 3B and 3C, for ease of explanation, only the members that are explained are shown. The same holds true in the drawings that follow.

As shown in FIG. 3A, the pixel electrode 1 in accordance with the first exemplary embodiment is divided into two sub-pixel electrodes 2. One of the two sub-pixel electrodes 2 that is on the right side in the drawing is the transmissive region T, and the other one on the left side is the reflective region R. The transmissive region T is structured with the transparent conductive thin film 3. The reflective region R has a layered structure constituted of the transparent conductive thin film 3 and the reflective conductive thin film 4, except for part of the region that will be explained later.

The adjacent sub-pixel electrodes 2 are connected to each other by a connecting portion 5 that extends in the X direction in FIG. 3A. The region where the connecting portion 5 is formed is the connecting region C. The connecting portion 5 is formed by providing, between the sub-pixel electrodes 2, two opening portions 6 each of which is a pattern removed portion. In this manner, the connecting portion 5 is formed integrally with the sub-pixel electrodes 2.

The connecting portion 5 in accordance with the first exemplary embodiment is formed so as to extend from substantially the center region of each of facing sides M1 at which the two sub-pixel electrodes 2 face each other, and in the normal line direction of the facing sides M1. As to the location of the connecting portion 5, any location that attains connection of the facing sides M1 at which the adjacent sub-pixel electrodes 2 face each other suffices, and at which geometric points of the facing sides are connected to each other is not particularly limited.

The connecting portion 5 is structured with the transparent conductive thin film 3 that is integrally formed with the two sub-pixel electrodes 2. Though the width of the connecting portion 5 is not particularly limited, in consideration of suppression of breaking of the connecting portion 5, it is preferable that the connecting portion 5 has a width of equal to or greater than 8 μm. More preferably, the width thereof is equal to or greater than 10 μm. Though the upper limit of the width of the connecting portion 5 is not particularly limited in so far as not departing from the principle of the present invention, in consideration of alignment control force exerted over the liquid crystal, it is preferable that the width is equal to or smaller than 16 μm.

The sub-pixel electrode 2 being the one constituting the reflective region R has the reflective conductive thin film 4 in which a hollowed out cutout portion 7 is formed in a region extending from the connecting portion 5. In other words, the cutout portion 7 formed in the sub-pixel electrode 2 constituting the reflective region R is the region where the reflective conductive thin film 4 is not formed and instead only the transparent conductive thin film 3 is formed. Though a length D1 of the cutout portion 7 in the Y direction (the direction in parallel to the width of the connecting portion 5) in FIG. 3A is not particularly limited in so far as not departing from the principle of the present invention, it is assumed to be substantially identical to a width w1 of the connecting portion 5 in the first exemplary embodiment. By setting the length D1 of the cutout portion 7 in the Y direction in the FIG. 3A to be equal to or greater than the width w1 of the connecting portion 5, the effect of preventing a disturbance of the liquid crystal alignment can further be improved. In consideration of effective prevention of the disturbance of the liquid crystal alignment, it is preferable that the maximum value of the length D1 of the cutout portion 7 is not greater than one-third of a width w2 in the Y direction in FIG. 3A of the sub-pixel electrode 2 being the one constituting the reflective region R.

Each of the counter electrode projecting portions 45 provided at the counter substrate 40 is formed as a projecting structure at a layer above the counter electrode 24 (see FIG. 2). The counter electrode projecting portions 45 can be formed by photolithography using a photosensitive resin. By each of the counter electrode projecting portions 45 of the counter substrate 40, the alignment of the liquid crystal layer 52 corresponding to each sub-pixel electrode 2 is controlled. Specifically, by the counter electrode projecting portions 45 and in accordance with a voltage application, the liquid crystal molecules corresponding to the sub-pixel electrodes 2 can be switched from the vertical alignment to the multi-axis alignment (i.e., there exist a plurality of tilt directions of the liquid crystal molecules). It is assumed that the counter electrode projecting portions 45 are each formed to be located at the substantially central position in each of the sub-pixel electrodes 2.

The structure and the formation location of each of the counter electrode projecting portions 45 are not specifically limited in so far as the liquid crystal molecules can be switched from the vertical alignment to the multi-axis alignment in accordance with a voltage application, as explained in the foregoing. For example, known structures such as alignment controller projections, alignment controller openings and the like can be arranged on the counter substrate 40 side. It is also possible to arrange the counter electrode projecting portions 45 on the TFT substrate 20 side instead of on the counter substrate 40 side. Furthermore, the present invention is not limited to a manner in which one counter electrode projecting portion 45 is formed for one sub-pixel electrode 2 and, therefore, a plurality of counter electrode projecting portions 45 may be arranged for one sub-pixel electrode 2 so as to conform with the area, the shape and the like of the sub-pixel electrodes 2. Note that a liquid crystal layer thickness adjusting layer made of a transparent resin or the like may be formed in the reflective region R of the counter substrate 40, such that the transmissive region T and the reflective region R have substantially equivalent optical lengths passing through the liquid crystal layer 52.

Figure 4:
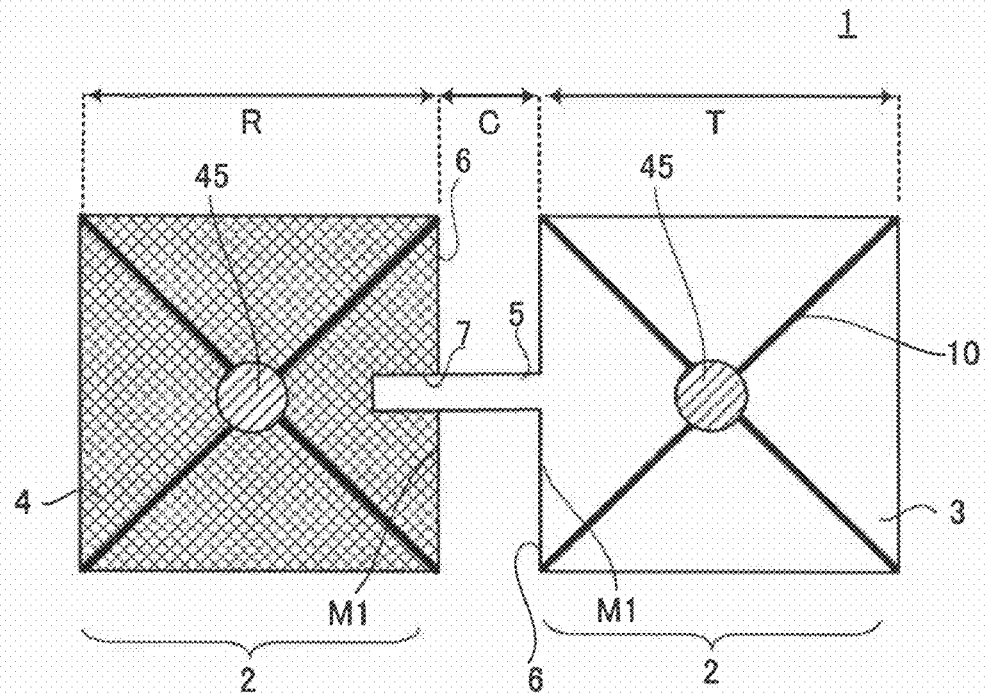
FIG. 4 is a schematic plan view showing the pixel electrode and an extinction pattern of liquid crystal in accordance with the first exemplary embodiment.

FIG. 4 shows, in addition to the schematic plan view of the pixel electrode 1, a schematic view of the extinction pattern (alignment state) of the liquid crystal in the crossed nicols state. In the FIG. 4, the reference numeral 10 denotes the schematic indication of the alignment directions of the liquid crystal. As shown in the FIG. 4, in each of the transmissive region T and the reflective region R, an excellent liquid crystal alignment of the multi-axis alignment about the counter electrode projecting portion 45 can be observed.

First Comparative Example

Next, in order to explain the effect of the present invention, comparative examples are explained. A pixel electrode in accordance with a first comparative example is basically structured similarly as in the first exemplary embodiment except for the following points. Specifically, the difference lies in that, while the cutout portion 7 of the reflective conductive thin film 4 is formed in the region that extends from the connecting portion 5 in the reflective region R in accordance with the first exemplary embodiment, such a cutout portion is not formed in a reflective region R in accordance with the first comparative example. Another difference lies in that, while the region structured as the layered structure of the transparent conductive thin film 3 and the reflective conductive thin film 4 exists only as the reflective region R being one of the sub-pixel electrodes 2 in accordance with the first exemplary embodiment, such a region structured as the layered structure of a transparent conductive thin film and a reflective conductive thin film exists through the reflective region R being one of the sub-pixel electrodes 2, the connecting region C, and the transmissive region T at the location near the connecting region C in accordance with the first comparative example.

Figure 12A:
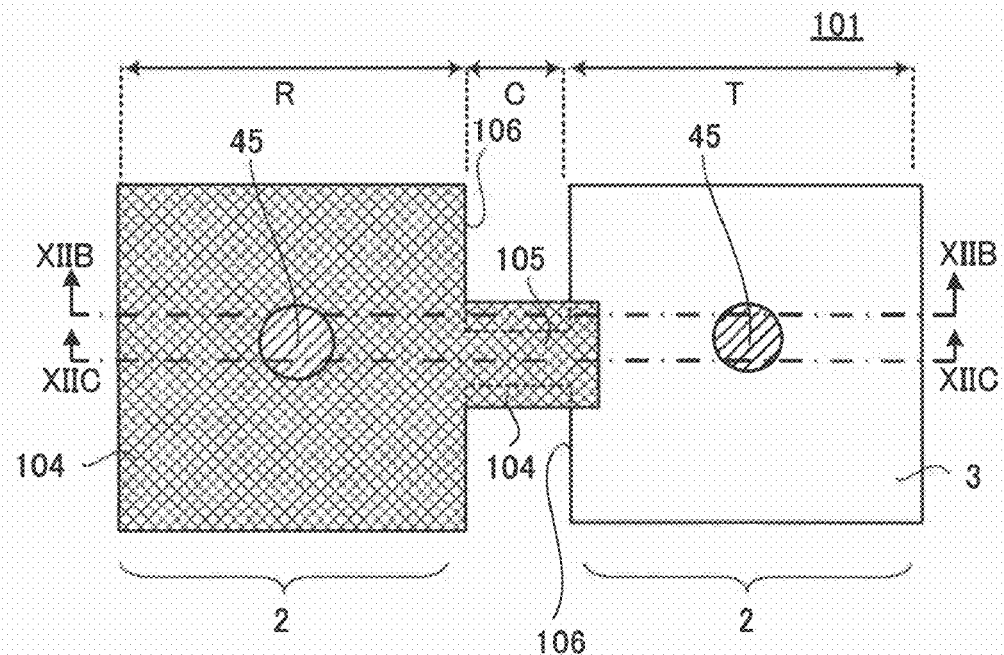
FIG. 12A is a schematic plan view of a pixel electrode in accordance with the first comparative example.
Figure 12B:
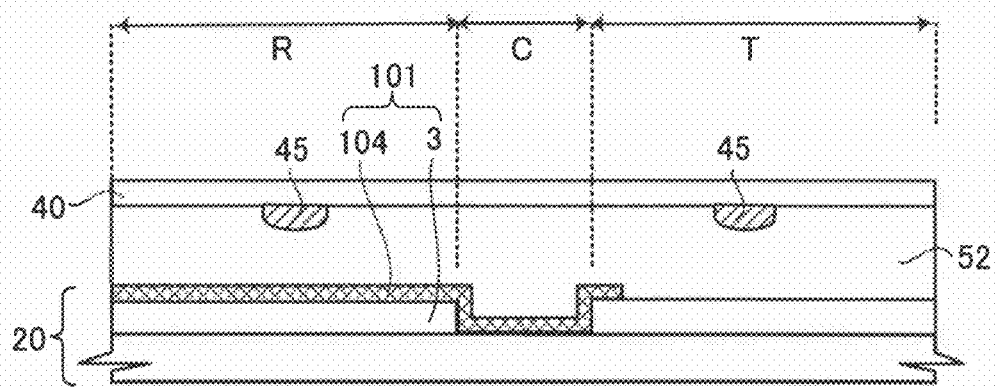
FIG. 12B is a schematic end view for describing a liquid crystal display device in accordance with the first comparative example.
Figure 12C:
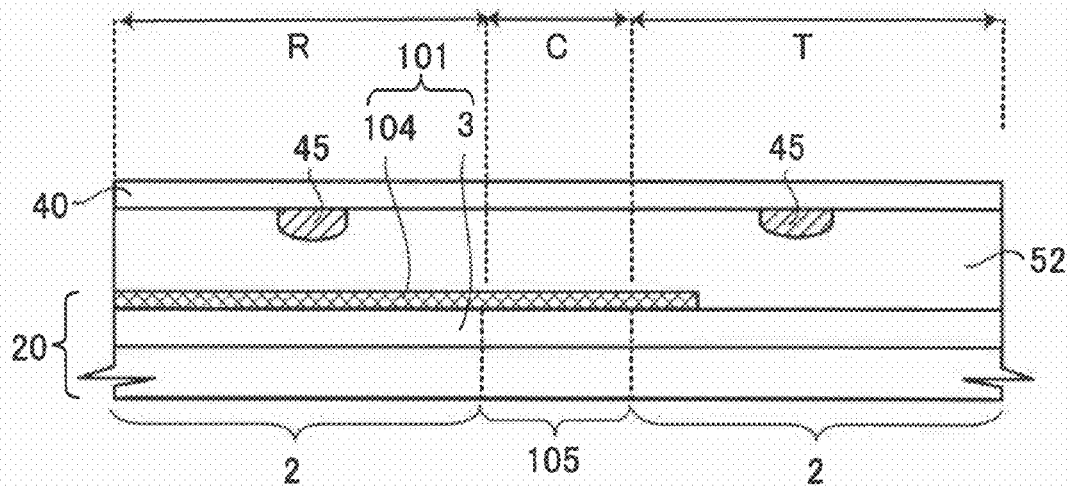
FIG. 12C is a schematic end view for describing the liquid crystal display device in accordance with the first comparative example.

FIG. 12A shows a schematic plan view of a pixel electrode 101 in accordance with the first comparative example. FIG. 12B shows a schematic end view for describing the structure of the liquid crystal display panel taken along a cross-sectional line XIIB-XIIB indicated in FIG. 12A, and FIG. 12C shows a schematic end view for describing the structure of the liquid crystal display panel taken along a cross-sectional line XIIC-XIIC indicated in FIG. 12A.

As shown in FIG. 12A, in the pixel electrode 101, two sub-pixel electrodes 2 and a connecting portion 105 that connects the electrodes 2 are formed by the transparent conductive thin film 3. Further, immediately above the transparent conductive thin film 3 that structures the pixel electrode 101, a reflective conductive thin film 104 is stacked in the following regions. Specifically, the reflective conductive thin film 104 is formed through the reflective region R, the connecting region C, and the transmissive region T at the location near the connecting region C. In other words, these regions have a layered structure of the transparent conductive thin film 3 and the reflective conductive thin film 104.

In order to prevent separation of the sub-pixel electrode being the transmissive region and the sub-pixel electrode being the reflective region from each other, the reflective conductive thin film 104 is formed so as to cover a top surface and side surfaces of the connecting portion 105 constituted of a transparent conductive thin film 103, and a bottom portion of each of opening portions 106 of the pixel electrode 101 at the location near the connecting portion 105.

Figure 13:
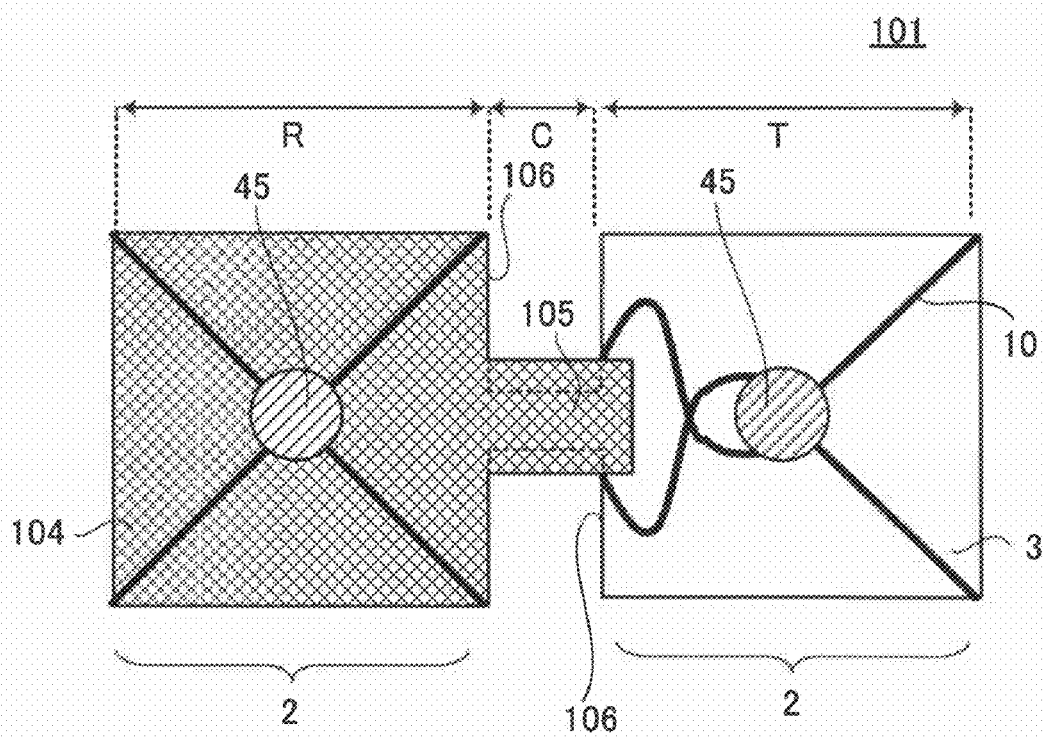
FIG. 13 is a schematic plan view showing the pixel electrode and the extinction pattern of liquid crystal in accordance with the first comparative example.

FIG. 13 shows, in addition to the schematic plan view of the pixel electrode 101, a schematic view of the extinction pattern (alignment state) of the liquid crystal in the crossed nicols state. As in the foregoing explanation, in the pixel electrode 101 in accordance with the first comparative example, the reflective conductive thin film 104 is integrally formed from the reflective region R to the transmissive region T at the location near the connecting region C. As shown in FIG. 13, this results in a significant difference in the extinction pattern of the liquid crystal between the transmissive region T and the reflective region R. Also, within the transmissive region T, this results in a difference in the alignment state between the right side and the left side relative to the counter electrode projecting portion 45. This is caused by a step height resulted from the reflective conductive thin film 104 that is arranged in the transmissive region T at the location near the connecting region C.

In the pixel electrode 101 in accordance with the first comparative example, as shown in FIG. 13, within the transmissive region T, the liquid crystal alignment is disturbed by the stepped structure of the reflective conductive thin film 104.

In contrast, the connecting portion 5 of the pixel electrode 1 in accordance with the first exemplary embodiment does not employ the structure in which the reflective conductive thin film 4 is arranged as an upper layer of the transparent conductive thin film 3. That is, the connecting portion 5 of the pixel electrode 1 in accordance with the first exemplary embodiment is constituted of the transparent conductive thin film 3. Furthermore, the cutout portion 7 of the reflective conductive thin film 4 is provided in the region extending from the connecting portion 5 in the sub-pixel electrode 2 that constitutes the reflective region R. In this manner, the disturbance of the liquid crystal alignment is not caused by the step height resulted from the reflective conductive thin film 104, which would otherwise be caused as in the first comparative example. Thus, the misalignment of the liquid crystal of the sub-pixel electrode 2 being the transmissive region T, which is adjacent to the sub-pixel electrode 2 being the reflective region R, can effectively be prevented. Accordingly, the liquid crystal display device 80 of high-quality display that can realize both the wider viewing angle and the higher contrast can be provided.

As results of experiments conducted by the present inventors, it has now been discovered that the rate of occurrence of disconnection of the connecting portion 5 in accordance with the first exemplary embodiment does not differ from that of the connecting portion 105 in accordance with the first comparative example. Specifically, the experiment results show that the rate of occurrence of disconnection does not differ between the case in which the cutout portion 7 is formed at the reflective conductive thin film 4 such that the connecting portion 5 is structured solely with the transparent conductive thin film 3, and the case in which, as in the first comparative example, the connecting region C and the sub-pixel electrode being the transmissive region T at the location near the connecting region C are structured as the layered structure of the transparent conductive thin film 103 and the reflective conductive thin film 104.

Second Exemplary Embodiment

Next, an exemplary pixel electrode whose structure is different from the above-described exemplary embodiment is explained. A pixel electrode in accordance with a second exemplary embodiment is basically structured similarly as in the above-described first exemplary embodiment except for the following points. Specifically, the difference lies in that, while the connecting portion 5 extends from substantially the center region of each of the facing sides M1 at which the two sub-pixel electrodes 2 face each other, and in the normal line direction of the facing sides M1 in accordance with the first exemplary embodiment, such a connecting portion extends from a location displaced from the center region of each of the facing sides M1 at which the two sub-pixel electrodes 2 face each other, and in the normal line direction of the facing sides M1 in accordance with the second exemplary embodiment. Another difference lies in the shape of the cutout portion of the sub-pixel electrode that constitutes the reflective region R.

Figure 5A:
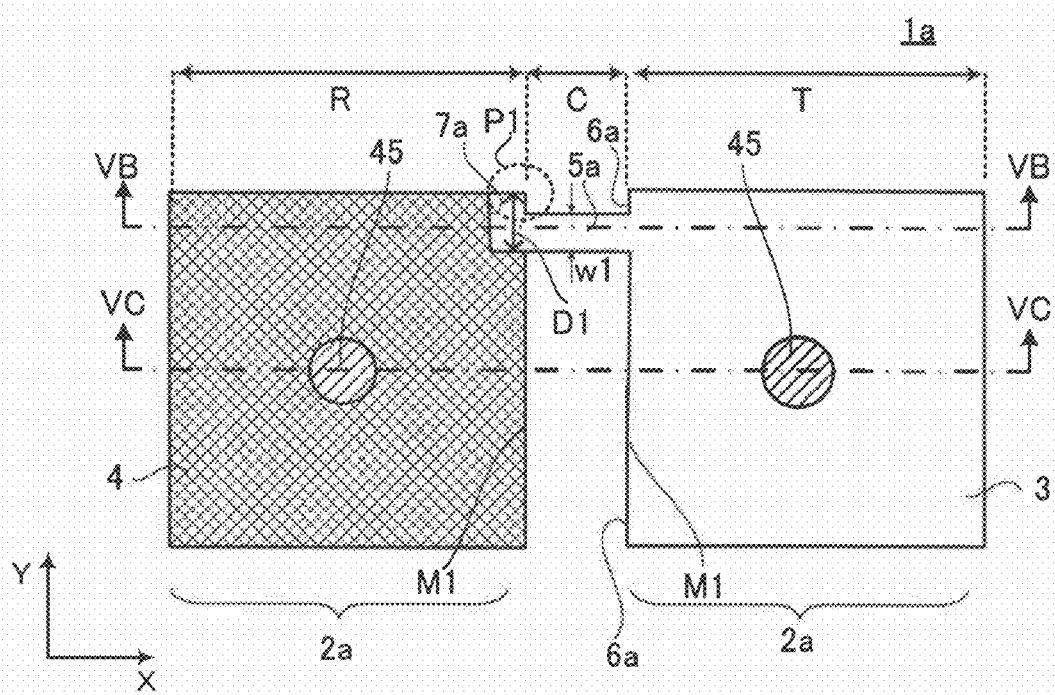
FIG. 5A is a schematic plan view of a pixel electrode in accordance with a second exemplary embodiment.
Figure 5B:
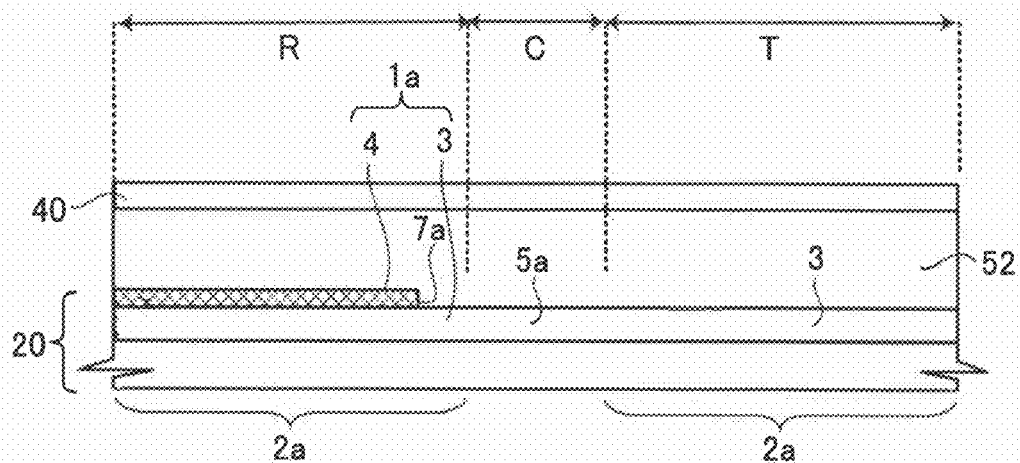
FIG. 5B is a schematic end view for describing the schematic structure of a liquid crystal display device in accordance with the second exemplary embodiment.
Figure 5C:
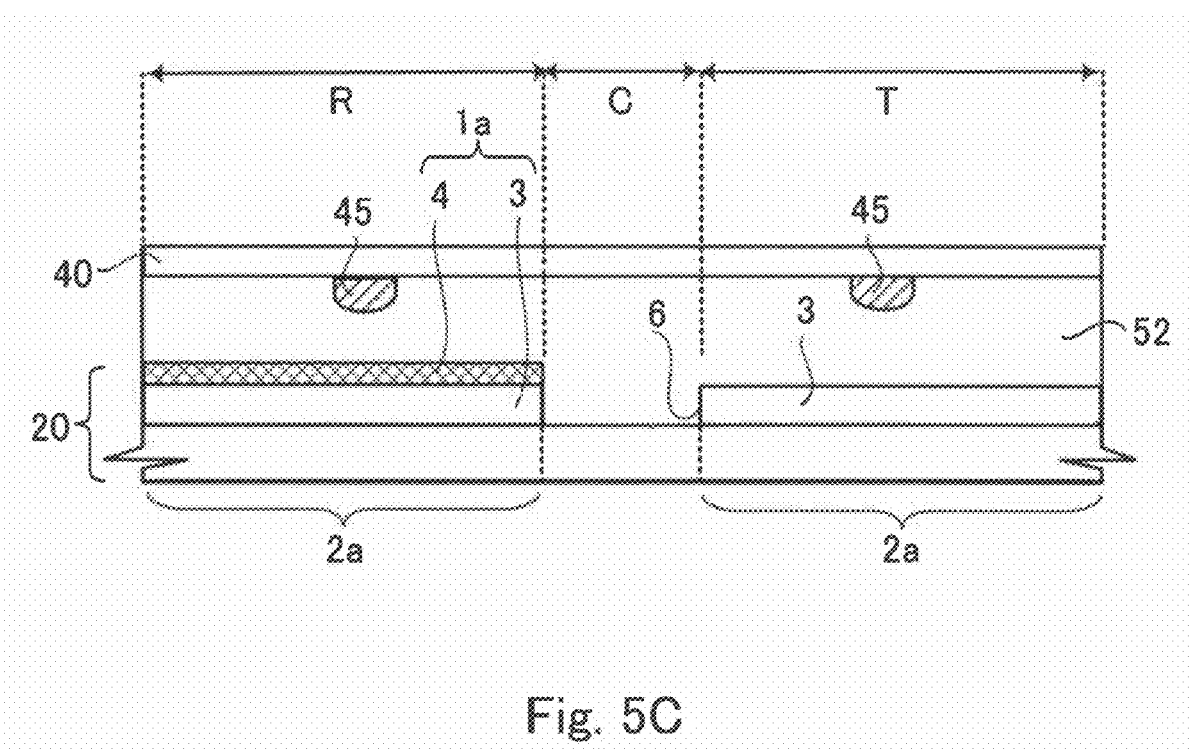
FIG. 5C is a schematic end view for describing the schematic structure of the liquid crystal display device in accordance with the second exemplary embodiment.

FIG. 5A shows a schematic plan view of a pixel electrode 1a in accordance with the second exemplary embodiment. FIG. 5B shows a schematic end view for describing the structure of the liquid crystal display panel 81 (see FIG. 2) taken along a cross-sectional line VB-VB in FIG. 5A, and FIG. 5C shows a schematic end view for describing the structure of the liquid crystal display panel 81 taken along a cross-sectional line VC-VC in FIG. 5A.

As shown in FIG. 5A, the pixel electrode 1a in accordance with the second exemplary embodiment is divided into two sub-pixel electrodes 2a. One of the two sub-pixel electrodes 2a that is on the right side in the FIG. 5A is the transmissive region T, and the other one on the left side is the reflective region R. The transmissive region T is structured with the transparent conductive thin film 3. The reflective region R has a layered structure constituted of the transparent conductive thin film 3 and the reflective conductive thin film 4.

A connecting portion 5a in accordance with the second exemplary embodiment is formed so as to extend, at the location upwardly shifted in the Y direction in the FIG. 5A from substantially a center region of each of the facing sides M1 at which the two sub-pixel electrodes 2a face each other, in the normal line direction of the facing sides M1. More specifically, the connecting portion 5a is formed to extend from the slightly downward location than a corner portion P1 at the facing sides M1 of the two sub-pixel electrodes 2a to the normal line direction of the facing sides M1. The connecting portion 5a is structured with the transparent conductive thin film 3 that is integrally formed with the two sub-pixel electrodes 2a.

In the sub-pixel electrode 2a being the one constituting the reflective region R, a cutout portion 7a is formed in a region extending from the connecting portion 5a. The length D1 in the Y direction shown in FIG. 5A of the cutout portion 7a is structured so as to be wider than the width w1 of the connecting portion 5a. In the second exemplary embodiment, it is formed such that the corner portion P1 region agrees with the cutout portion 7a region.

Figure 6:
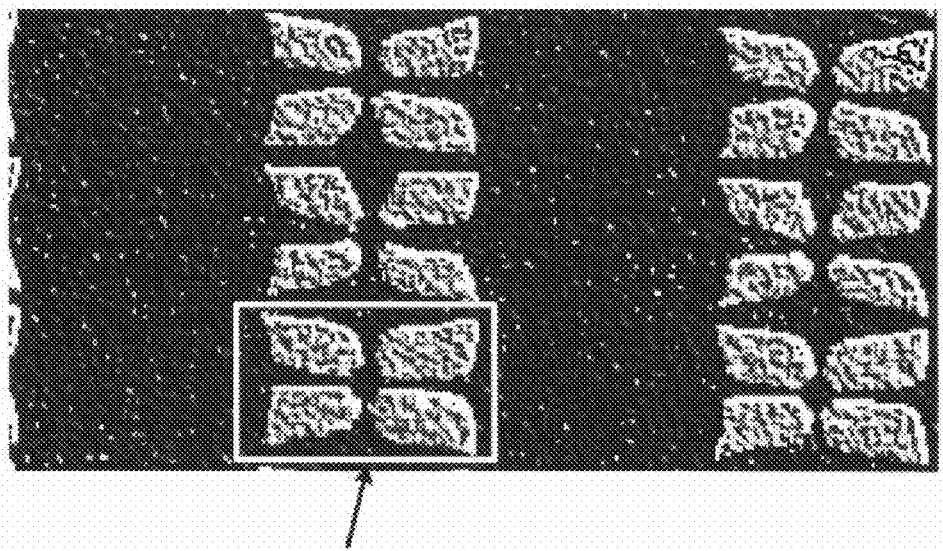
FIG. 6 is a polarizing microscope photograph of a liquid crystal display panel in accordance with the second exemplary embodiment (under the crossed nicols condition)
Figure 7:
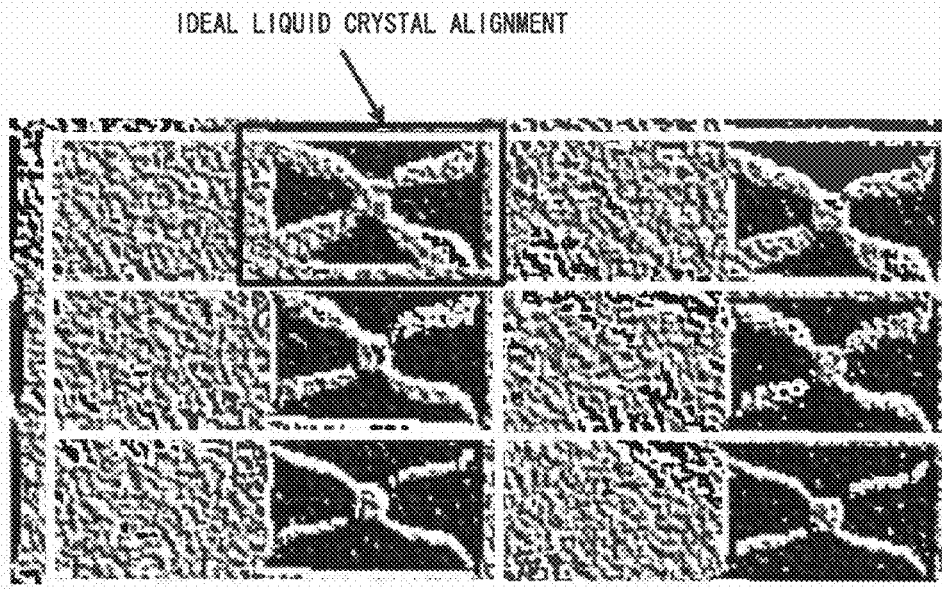
FIG. 7 is a polarizing microscope photograph of the liquid crystal display panel in accordance with the second exemplary embodiment (the sample being rotated by 45° from the crossed nicols state)

FIGS. 6 and 7 are the pictures as observed under a polarizing microscope in which the liquid crystal display panel in accordance with the second exemplary embodiment is arranged under polarizing plates that are perpendicular to each other. FIG. 6 is a polarizing microscope photograph taken under any crossed nicols, in which a voltage is applied to a sample so as to cause the panel to light up. On the other hand, FIG. 7 is a polarizing microscope photograph taken under a state in which a voltage is applied to a sample so as to cause the panel to light up, and the sample is rotated from the crossed nicols state by 45° about the normal line direction of the substrate surface.

From FIGS. 6 and 7, it can be seen that the alignment of the liquid crystal is not disturbed, and that the pixels show uniform display.

Second Comparative Example

A pixel electrode in accordance with a second comparative example is basically structured similarly as in the first comparative example except for the following point. Specifically, the difference lies in that, while the connecting portion 105 extends from substantially the center region of each of the facing sides M1 at which the two sub-pixel electrodes 102 face each other, and in the normal line direction of the facing sides M1 in accordance with the first comparative example, such a connecting portion extends from a location shifted from the center region of each of the facing sides at which two sub-pixel electrodes face each other, and in the normal line direction of the facing sides in accordance with the second comparative example.

Figure 14:
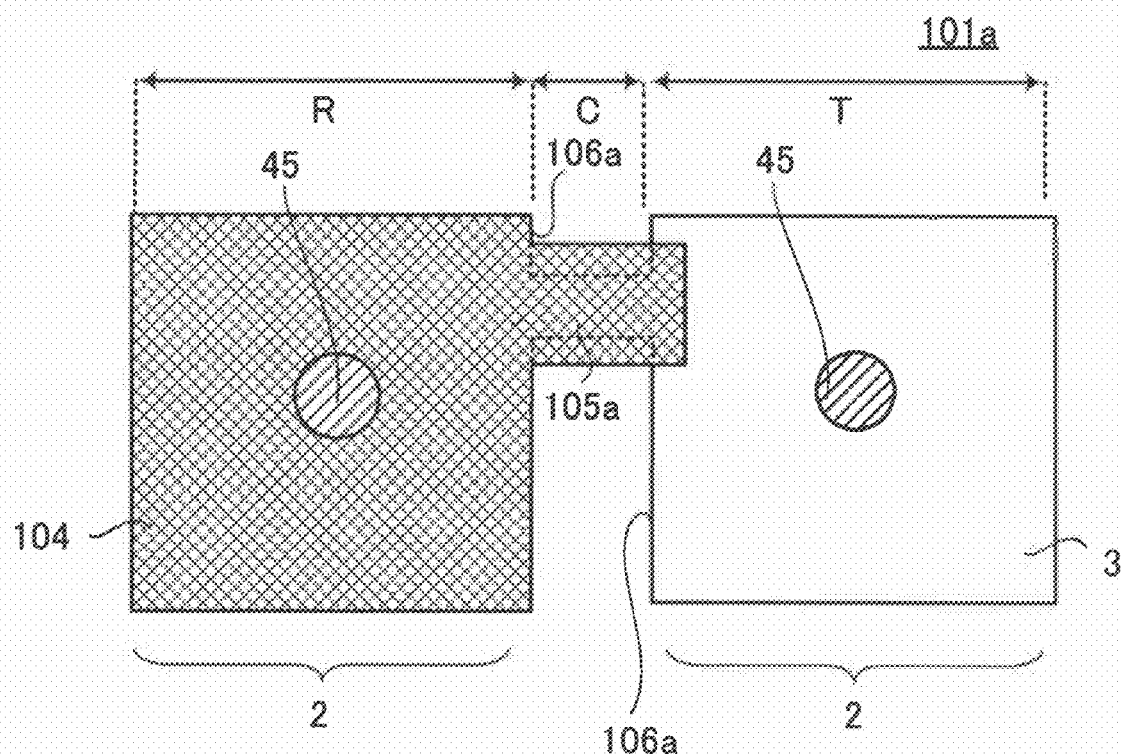
FIG. 14 is a schematic plan view of a pixel electrode in accordance with the second comparative example.

FIG. 14 shows a schematic plan view of a pixel electrode 101a in accordance with the second comparative example.

Figure 15:
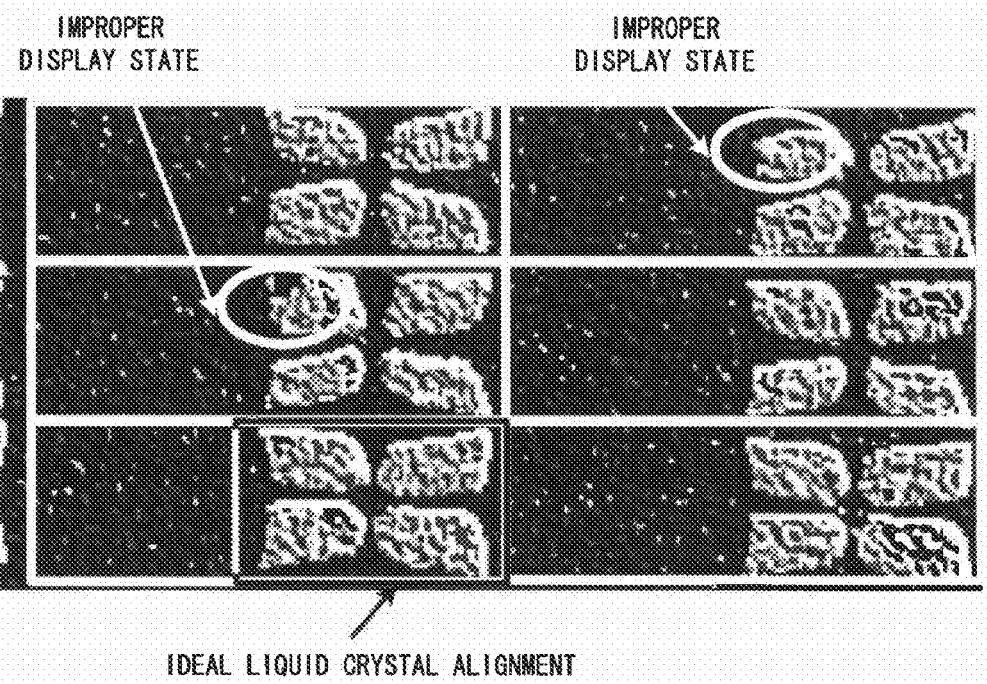
FIG. 15 is a polarizing microscope photograph of a liquid crystal display panel in accordance with the second comparative example (under the crossed nicols condition)
Figure 16:
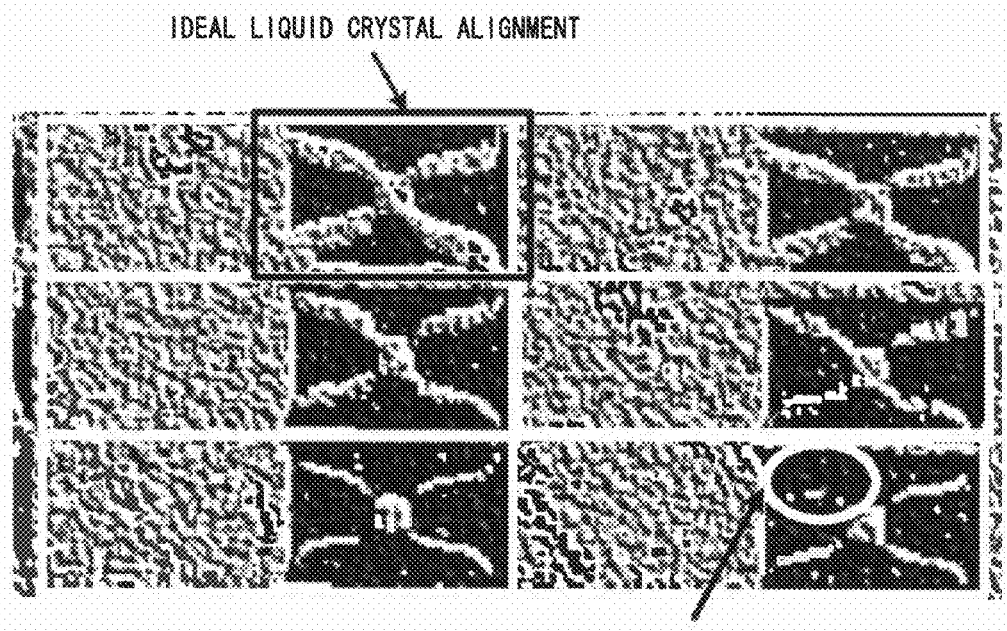
FIG. 16 is a polarizing microscope photograph of the liquid crystal display panel in accordance with the second comparative example (the sample being rotated by 45° from the crossed nicols state).

FIGS. 15 and 16 are the pictures as observed under a polarizing microscope in which the liquid crystal display panel in accordance with the second comparative example is arranged under polarizing plates that are perpendicular to each other. FIG. 15 is a photograph as observed under any crossed nicols, in which a voltage is applied to a sample so as to cause the panel to light up. On the other hand, FIG. 16 is a photograph in a state in which a voltage is applied to a sample so as to cause the panel to light up, and the sample is rotated from the crossed nicols state by 45° about the normal line direction of the substrate surface.

From FIGS. 15 and 16, it can be seen that the alignment of the liquid crystal is disturbed in part of the pixel electrodes within the display area. More specifically, it can be seen that, in the transmissive region T, there are pixels whose alignment of the liquid crystal is disturbed as being originated from the step height of the edge portion of the reflective conductive thin film 104. It has now been discovered that such a disturbance of the alignment of the liquid crystal can be improved in accordance with the second exemplary embodiment than in accordance with the second comparative example.

Figure 8:
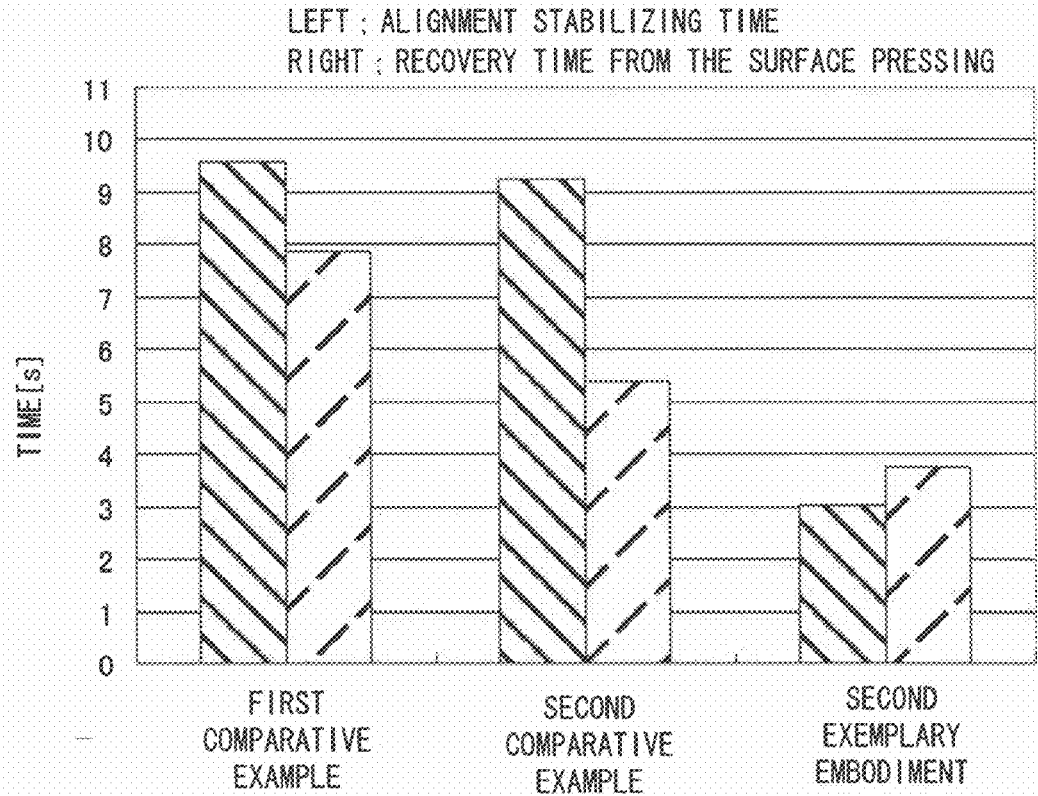
FIG. 8 is a plot of an alignment stabilizing time and a recovery time from the surface pressing each in accordance with the second exemplary embodiment, a first comparative example, and a second comparative example.

Next, an explanation is given of a result of a study of display characteristics of the liquid crystal display panels in accordance with the second exemplary embodiment, the first comparative example, and the second comparative example, as to an alignment stabilizing time and as to a case in which a certain pressure such as surface pressing is applied onto part of the display surface. FIG. 8 shows a result of plotting, for each of the liquid crystal display panels in accordance with the first comparative example, the second comparative example, and the second exemplary embodiment, the alignment stabilizing time and the time from an improper display state caused by an alignment disturbance of the liquid crystal when subjected to a certain pressure such as surface pressing applied onto part of the display surface until such an improper display state is resolved. As a result, as compared with the first comparative example and the second comparative example, it has been discovered that the second exemplary embodiment achieves a shorter alignment stabilizing time and a shorter time for resolving the improper display state. Furthermore, it has been discovered that, as compared with the first comparative example and the second comparative example, variations among the liquid crystal display panels in accordance with the second exemplary embodiment are small.

In accordance with the second exemplary embodiment, since the structure in which a reflective conductive thin film is arranged as an upper layer of the connecting portion 5*a* is not employed, and the cutout portion 7*a* is provided at a prescribed position of the sub-pixel electrode 2*a* constituting the reflective region R, the effects similar to those by the above-described first exemplary embodiment can be obtained.

Third Exemplary Embodiment

Next, an exemplary pixel electrode whose structure is different from the above-described exemplary embodiments is explained. A pixel electrode in accordance with a third exemplary embodiment is basically structured similarly as in the above-described first exemplary embodiment except for the following point. Specifically, the difference lies in that, while the length D1 in the Y direction in FIG. 3 of the cutout portion 7 of the sub-pixel electrode 2 being the reflective region R is identical to the width w1 of the connecting portion 5 in accordance with the above-described first exemplary embodiment, such a length D1 of the cutout portion of the sub-pixel electrode being the reflective region R is wider than the width w1 of the connecting portion in accordance with the third exemplary embodiment.

Figure 9:
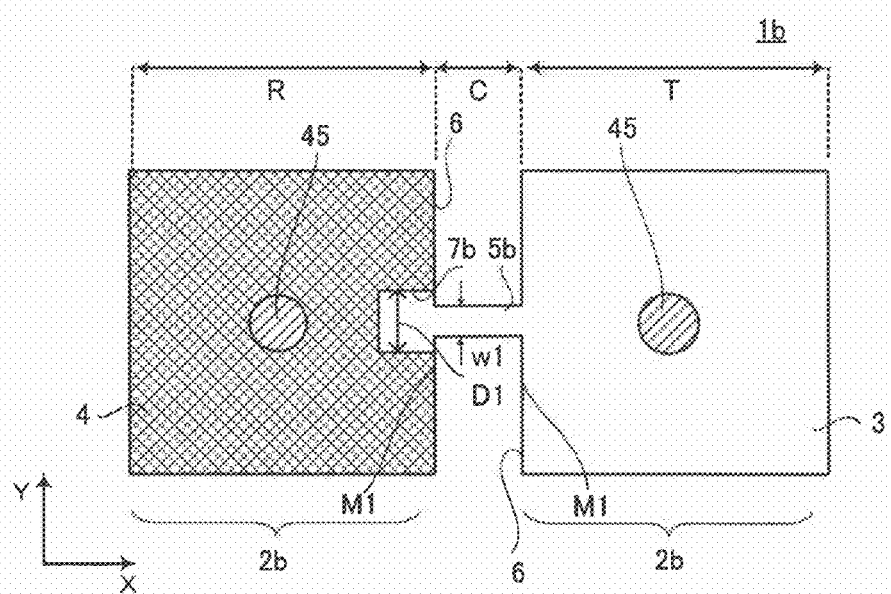
FIG. 9 is a schematic plan view of a pixel electrode in accordance with a third exemplary embodiment.

FIG. 9 shows a schematic plan view of a pixel electrode 1*b* in accordance with the third exemplary embodiment. The pixel electrode 1*b* in accordance with the third exemplary embodiment is structured such that two sub-pixel electrodes 2*b* are coupled by connecting portion 5*b*.

In the sub-pixel electrode 2*b* being the one constituting the reflective region R, a cutout portion 7*b* is formed in a region extending from the connecting portion 5*b*. The length D1 in the Y direction in FIG. 9 of the cutout portion 7*b* is structured so as to be wider than the width w1 of the connecting portion 5*b*.

In accordance with the third exemplary embodiment, since the structure in which a reflective conductive thin film is arranged as an upper layer of the connecting portion 5*b* is not employed, and the cutout portion 7*b* is provided at the sub-pixel electrode 2*b* constituting the reflective region R, the effects similar to those by the above-described first exemplary embodiment can be obtained.

Fourth Exemplary Embodiment

Next, an exemplary pixel electrode whose structure is different from the above-described exemplary embodiments is explained. A pixel electrode in accordance with a fourth exemplary embodiment is basically structured similarly as in the above-described third exemplary embodiment except for the following point. Specifically, the difference lies in that, while the length D1 in the Y direction in FIG. 9 of the cutout portion 7*b* of the sub-pixel electrode 2 being the reflective region R is constant in accordance with the above-described third exemplary embodiment, the length of the cutout portion of the sub-pixel electrode being the reflective region R varies stepwise in accordance with the fourth exemplary embodiment.

Figure 10:
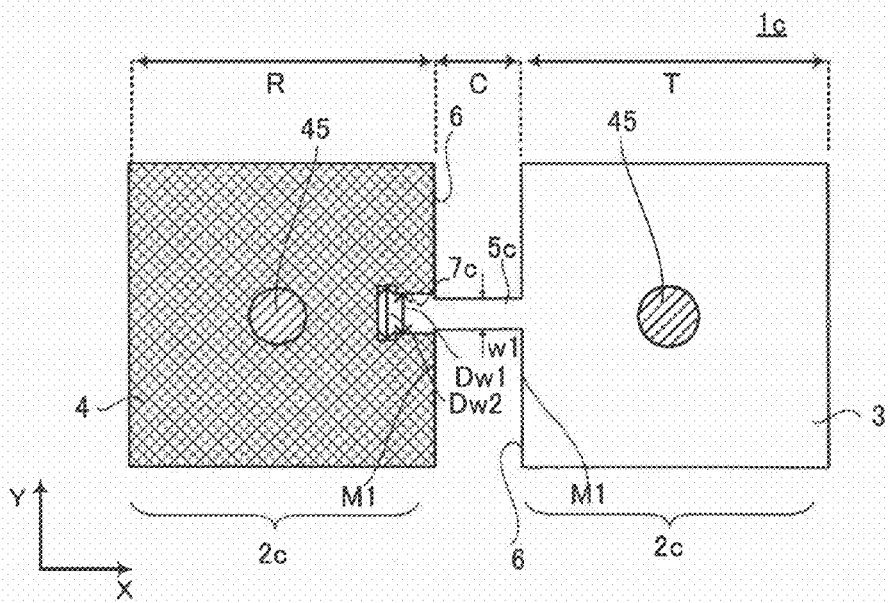
FIG. 10 is a schematic plan view of a pixel electrode in accordance with a fourth exemplary embodiment.

FIG. 10 shows a schematic plan view of a pixel electrode 1*c* in accordance with the fourth exemplary embodiment. The pixel electrode 1*c* in accordance with the fourth exemplary embodiment is structured such that two sub-pixel electrodes 2*c* are coupled by connecting portion 5*c*.

In the sub-pixel electrode 2*c* being the one constituting the reflective region R, a cutout portion 7*c* is formed in a region extending from the connecting portion 5*c*. The cutout portion 7*c* is formed so as to have a stepped structure in which the length in the Y direction in FIG. 10 is two-stepwise. Specifically, the cutout portion 7*c* is constituted of a region whose length in the Y direction in FIG. 10 is Dw1 and a region whose length in the Y direction in FIG. 10 is Dw2. In accordance with the third exemplary embodiment, as shown in FIG. 10, the relationship w1<Dw1<Dw2 is satisfied.

In accordance with the fourth exemplary embodiment, since the structure in which a reflective conductive thin film is arranged as an upper layer of the connecting portion 5*c* is not employed, and the cutout portion 7*c* is provided at the sub-pixel electrode 2*c* constituting the reflective region R, the effects similar to those by the first exemplary embodiment can be obtained.

Fifth Exemplary Embodiment

Next, an exemplary pixel electrode whose structure is different from the above-described exemplary embodiments is explained. A pixel electrode in accordance with a fifth exemplary embodiment is basically structured similarly as in the above-described first exemplary embodiment except for the following point. Specifically, the difference lies in that, while the shape of the cutout portion 7 of the sub-pixel electrode 2 being the reflective region R is rectangular in the above-described first exemplary embodiment, the corners of the cutout portion of the sub-pixel electrode being the reflective region R is rounded in accordance with the fifth exemplary embodiment.

Figure 11:
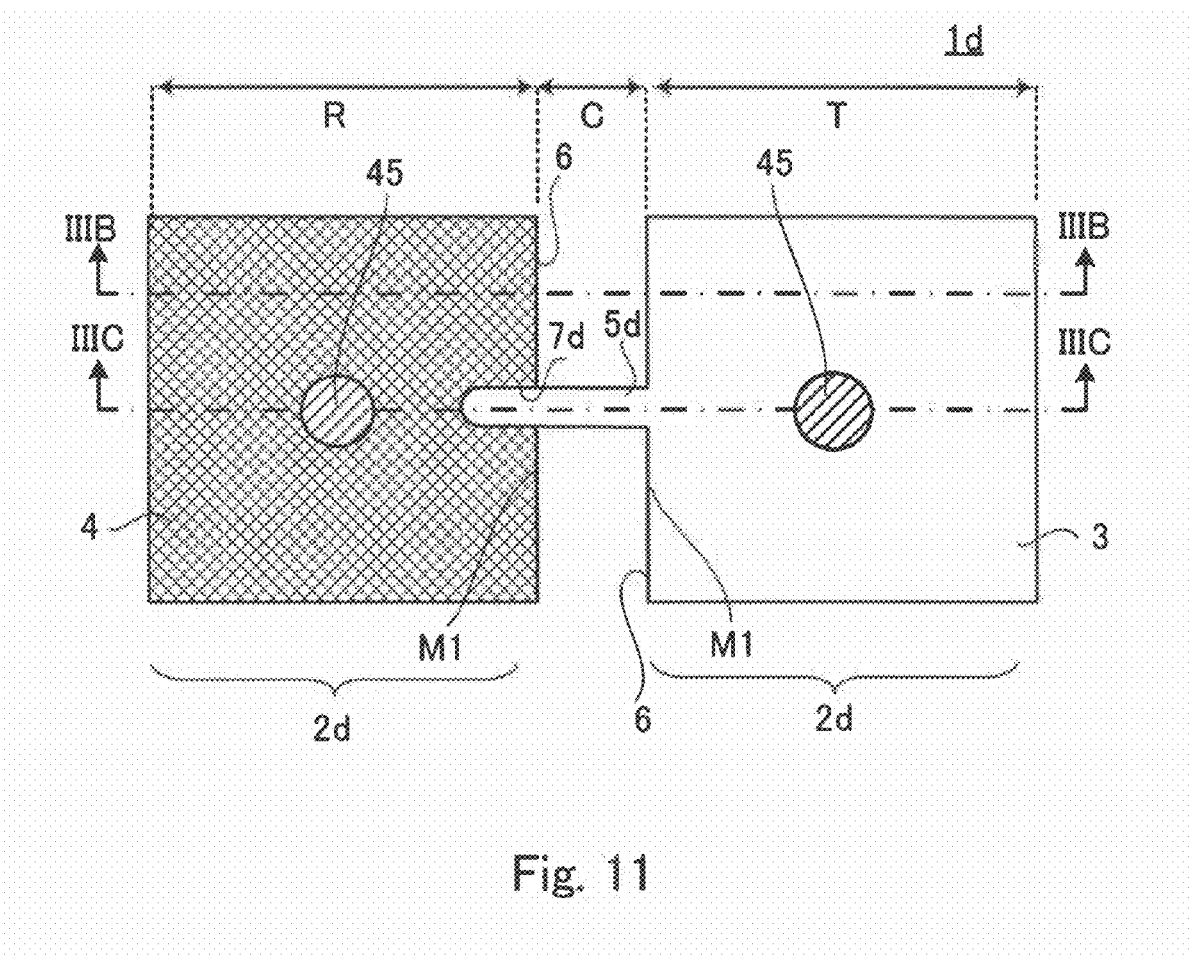
FIG. 11 is a schematic plan view of a pixel electrode in accordance with a fifth exemplary embodiment.

FIG. 11 shows a schematic plan view of a pixel electrode 1*d* in accordance with the fifth exemplary embodiment. The pixel electrode 1*d* in accordance with the fifth exemplary embodiment is structured such that two sub-pixel electrodes 2*d* are coupled by connecting portion 5*d*.

In the sub-pixel electrode 2*d* being the one constituting the reflective region R, a cutout portion 7*d* is formed in a region extending from the connecting portion 5*d*. As shown in FIG. 11, the cutout portion 7*d* is formed such that the corners of a cut portion of the reflective conductive thin film 4 are rounded.

In accordance with the fifth exemplary embodiment, since the structure in which a reflective conductive thin film is arranged as an upper layer of the connecting portion 5d is not employed, and the cutout portion 7d is provided at the sub-pixel electrode 2d constituting the reflective region R, the effects similar to those by the above-described first exemplary embodiment can be obtained.

The present invention can suitably be carried out in any combination of the first to fifth exemplary embodiment. Also, the elements of the exemplary embodiments can suitably be combined. Furthermore, in connection with the above-described first to fifth exemplary embodiments, while the explanations have been given of the exemplary cases in which the alignment of the liquid crystal layer is controlled by the counter electrode projecting portions, the present invention is not limited thereto and various alignment controlling means can be adopted. For example, any alignment controller slit can be provided at the pixel electrode or any alignment controller opening can be provided. Furthermore, in connection with the above-described first to fifth exemplary embodiments, while the explanations have been given of the exemplary cases in which the alignment in the liquid crystal layer is changed from the vertical alignment to the multi-axis alignment in accordance with a voltage application, the present invention is not limited to the use of the liquid crystal in the vertical alignment mode, and can be applied to the liquid crystal display device that has the sub-pixel electrodes.

Furthermore, the present invention can widely be applied to those cases in which at least part of the pixel electrode includes the sub-pixel electrode constituting the transmissive region T and the sub-pixel electrode constituting the reflective region R connecting to each other by the connecting portion.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A transflective type liquid crystal display device, comprising:
   a the liquid crystal layer;
   a first sub-pixel electrode that is constituted of a transmissive region transmitting light from a back surface side to a display surface side;
   a second sub-pixel electrode that is constituted of a reflective region reflecting light being incident from the display surface side; and
   a connecting portion that electrically connects the first sub-pixel electrode and the second sub-pixel electrode to each other, wherein
   the second sub-pixel electrode is adjacent to the first sub-pixel electrode and has, in a region extending from the connecting portion connecting the first sub-pixel electrode and the second sub-pixel electrode, a reflective conductive thin film in which a hollowed out cutout portion is formed, and
   in the reflective region, a region except for the cutout portion has a layered structure constituted of, in this order, the liquid crystal layer, the reflective conductive thin film, and a transparent conductive thin film.

2. The transflective type liquid crystal display device according to claim 1, wherein the liquid crystal layer is predominantly composed of a vertical alignment mode liquid crystal.

3. The transflective type liquid crystal display device according to claim 1, wherein a width of the cutout portion is equal to or greater than a width of the connecting portion, the widths each being measured in a direction extending parallel to a side of the second sub-pixel electrode facing the first sub-pixel electrode.

4. The transflective type liquid crystal display device according to claim 2, wherein a width of the cutout portion is equal to or greater than a width of the connecting portion, the widths each being measured in a direction extending parallel to a side of the second sub-pixel electrode facing the first sub-pixel electrode.

5. The transflective type liquid crystal display device according to claim 1, wherein a width of the cutout portion is equal to or smaller than one-third of a width of a side of the second sub-pixel electrode facing the first sub-pixel electrode, the widths each being measured in a direction extending parallel to the side of the second sub-pixel electrode facing the first sub-pixel electrode.

6. The transflective type liquid crystal display device according to claim 2, wherein a width of the cutout portion is equal to or smaller than one-third of a width of a side of the second sub-pixel electrode facing the first sub-pixel electrode, the widths each being measured in a direction extending parallel to the side of the second sub-pixel electrode facing the first sub-pixel electrode.

7. The transflective type liquid crystal display device according to claim 3, wherein a width of the cutout portion is equal to or smaller than one-third of a width of a side of the second sub-pixel electrode facing the first sub-pixel electrode, the widths each being measured in a direction extending parallel to the side of the second sub-pixel electrode facing the first sub-pixel electrode.

8. The transflective type liquid crystal display device according to claim 1, wherein the connecting portion is formed by an opening between the first sub-pixel electrode and the second sub-pixel electrode.

9. The transflective type liquid crystal display device according to claim 1, wherein the connecting portion is formed by a transparent conductive thin film that structures the transmissive region.

10. The transflective type liquid crystal display device according to claim 2, wherein the connecting portion is formed by a transparent conductive thin film that structures the transmissive region.

11. The transflective type liquid crystal display device according to claim 3, wherein the connecting portion is formed by a transparent conductive thin film that structures the transmissive region.

12. The transflective type liquid crystal display device according to claim 1, wherein
   in the reflective region, the cutout portion is structured with a transparent conductive thin film, and
   the transmissive region and the connecting portion are structured with the transparent conductive thin film.

13. The transflective type liquid crystal display device according to claim 2, wherein
   in the reflective region, the cutout portion is structured with a transparent conductive thin film, and
   the transmissive region and the connecting portion are structured with the transparent conductive thin film.

14. The transflective type liquid crystal display device according to claim 3, wherein
   in the reflective region, the cutout portion is structured with a transparent conductive thin film, and
   the transmissive region and the connecting portion are structured with the transparent conductive thin film.

15. The transflective type liquid crystal display device according to claim 1, wherein the cutout portion has rounded corners opposing the connecting portion.

16. The transflective type liquid crystal display device according to claim 1, wherein a width of the cutout portion increases stepwise from a side of the second sub-pixel electrode facing the first sub-pixel electrode, the width being measured in a direction extending parallel to the side of the second sub-pixel electrode facing the first sub-pixel electrode.

17. The transflective type liquid crystal display device according to claim 1, wherein the cutout portion and connecting portion are formed at a position shifted substantially from a center region, the center region essentially extending in a direction centerline from the side of the first sub-pixel electrode facing the second sub-pixel electrode to the opposing side of the second sub-pixel electrode.

18. The transflective type liquid crystal display device according to claim 1, wherein a width of the connecting portion is greater than or equal to 8 μm, the width being measured with respect to a side of the second sub-pixel electrode facing the first sub-pixel electrode and measured in a direction extending parallel to the side of the second sub-pixel electrode.

* * * * *